United States Patent

Verhoeven et al.

[15] 3,646,458

[45] Feb. 29, 1972

[54] CIRCUIT ARRANGEMENT FOR DETECTING A TELEVISION SIGNAL HAVING A DIFFERENTIAL CIRCUIT WITH A COMMON EMITTER TRANSISTOR

[72] Inventors: Leonardus Adrianus Johannes Verhoeven; Hendrikus Dollekamp, both of Emmasingel, Eindhoven, Netherlands

[73] Assignee: U.S. Philips Corporation, New York, N.Y.

[22] Filed: Mar. 27, 1970

[21] Appl. No.: 23,326

[30] Foreign Application Priority Data

Apr. 5, 1969 Netherlands ..........................6905354

[52] U.S. Cl. ................................329/50, 307/235, 307/242, 329/101, 330/30 D

[51] Int. Cl. ..........................................................H03d 3/18

[58] Field of Search ....................329/50, 101, 145; 307/241, 307/242, 243, 244, 235; 330/30 D

[56] References Cited

UNITED STATES PATENTS

| | | | |
|---|---|---|---|
| 3,241,078 | 3/1966 | Jones | 329/50 |
| 3,497,824 | 2/1970 | Goordman | 330/30 D |
| 3,512,096 | 5/1970 | Nagata et al. | 330/30 D X |

*Primary Examiner*—Alfred L. Brody
*Attorney*—Frank R. Trifari

[57] ABSTRACT

A video detector circuit comprising a long-tailed pair arrangement employing a first and a second transistor and a third transistor in the common emitter of the first and the second transistor, the third transistor being linearly controlled by the signal to be detected and the first and second transistors being switched by the same signal.

5 Claims, 2 Drawing Figures

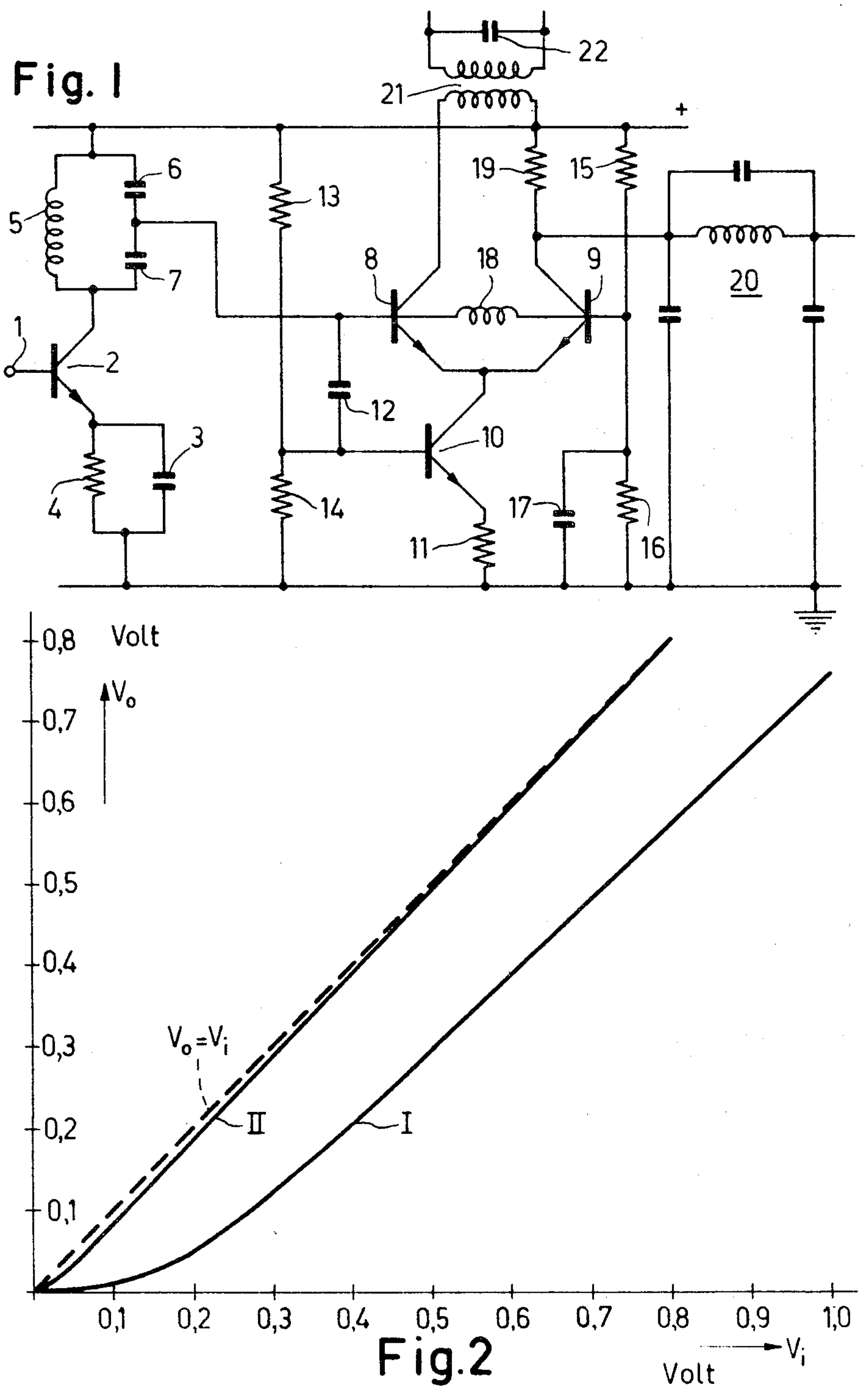
Fig. I, Fig.2
INVENTORS
LEONARDUS A.J. VERHOEVEN
HENDRIKUS DOLLEKAMP
BY
AGENT

CIRCUIT ARRANGEMENT FOR DETECTING A TELEVISION SIGNAL HAVING A DIFFERENTIAL CIRCUIT WITH A COMMON EMITTER TRANSISTOR

The invention relates to a circuit arrangement for detecting a television signal which is at least partially single sideband amplitude modulated.

For detecting the amplitude-modulated television signal, for example, in a television receiver it is common practice to apply the signal to a detection diode which is loaded by an RC network. The following problems occur in such a video detection circuit.

For obtaining a high detection efficiency the product $\omega$ RC, wherein $\omega$ is the angular frequency of the carrier, R is the resistance of the RC network and C is the capacitance of the RC network, must be considerably higher than 1. On the other hand, for detecting the signal as much as possible free from distortion it is necessary that the product $p$RC, wherein $p$ is the highest angular frequency of the carrier-modulated video signal, is considerably smaller than 1. As a result of the large relative bandwidth of the modulated television signal the highest video frequency $p$ is not so much lower than the carrier frequency $\omega$ that the two above-mentioned requirements can easily be satisfied and therefore a compromise must be made.

A further drawback resides in the fact that the current voltage characteristic of the detection diode between the cutoff range and the pass range has a gradually extending transition range. For obtaining a linear detection which is as satisfactory as possible, it is necessary that the amplitude of the signal applied to the diode is always sufficiently great relative to the said transition range. In practice, this means that the carrier amplitude must always be at least 0.5 v. Since the modulation depth of the television signal is very great (90 percent) this means that the peak-to-peak value of the television signal to be applied to the detector must be at least 10 v. It is found that such a great signal amplitude is difficult to obtain with a transistor amplifier, since then there is a great risk that the last amplifier stage preceding the detector is overdriven so that cross modulation occurs. In addition, when the entire interme;iate frequency amplifier is formed as one integrated amplifier, there is a great risk of parasitic oscillation.

It is an object of the present invention to provide a video detection circuit wherein the above-mentioned drawbacks are obviated and to this end the circuit arrangement according to the invention is characterized in that a first and a second transistor are incorporated in a long-tailed pair arrangement, the emitter electrodes of the two transistors being connected to the collector electrode of a third transistor, the television signal to be detected being applied on the one hand to one of the control electrodes of the third transistor and controlling this transistor linearly and being applied on the other hand to at least one of the base electrodes of the first and second transistors at so high an amplitude that these two transistors are alternately switched from a condition which is at least approximately fully cut off to a condition which conveys at least approximately the full collector current of the third transistor, the detected video signal being derived from at least one of the collector elec,rodes of the first and the second transistor.

It is known to use such long-tailed pair arrangements for the synchronous detection of a signal. In that case an unmodulated carrier is applied to at least one of the base electrodes of the said first and second transistors, the frequency and the phase of which carrier accurately correspond to the frequency and the phase of the carrier on which the signal was modulated originally. Such synchronous detectors serve to prevent the quadrature distortion which inevitably occurs in other detection methods in case of a signal which is fully or partially single sideband modulated. However, in many cases such as in television receivers the original carrier required for the synchronous detection is not available, it is true that it is theoretically possible to derive this carrier from the television signal, but a very highly selective and accurately tuned filter is required for this purpose: the risk of phase errors occurring is then so great that this method is not usable in practice.

For this reason synchronous detection is deliberately not used in the circuit arrangement according to the invention. In fact, for detection the television signal itself and not the original carrier is applied as a switching signal to the first and the second transistor of the long-tailed pair arrangement. As a result thereof the same quadrature distortion of the detected signal as that which is also produced in conventional envelope detection employing a diode and an RC network occurs in the detection circuit according to the invention. However, on the other hand the detection circuit according to the invention has a number of essential advantages relative to this conventional detection circuit. In the first place the above-described compromise of proportioning the RC network is not present in the circuit arrangement according to the invention. In addition the detection circuit according to the invention is able to detect substantially linearly without a high signal voltage at the input of the detector, with all attendant drawbacks, being required for this purpose.

In order that the invention may be readily carried into effect, one embodiment thereof will now be described in detail, by way of example, with reference to the accompanying diagrammatic drawing in which:

FIG. 1 shows an embodiment of a circuit arrangement according to the invention,

FIG. 2 shows the detec,ion characteristic of a circuit arrangement according to the invention and of a conventional diode-video detector.

The circuit arrangement shown in FIG. 1 is provided with an input terminal 1 to which the IF television signal is applied which is single sideband amplitude modulated on a carrier of, for example, 38.9 MHz. in known manner, at least as regards the higher video frequencies. This signal is applied to the base electrode of a transistor 2 functioning as the last IF amplifier stage. The emitter lead of this transistor includes an emitter resistor 4 which is decoupled by a capacitor 3 and which serves for the direct current adjustment of the transistor. The collector lead includes a resonant circuit tuned to the IF television signal and comprising an inductor 5 and two series-arranged capacitors 6 and 7. The amplified IF television signal is derived from the common point of these two capacitors.

The circuit arrangement furthermore includes a so-called long-tailed pair arrangement comprising two transistors 8 and 9 and a further transistor 10 the collector electrode of which is connected to the two emitter electrodes of the transistors 8 and 9. The emitter electrode of the transistor 10 is connected to ground (the negative terminal of the voltage supply source) through an emitter resistor 11.

The IF television signal amplified by the transistor 2 is applied to the base electrode of the transistor 8. In addition this signal is applied through a capacitor 12 to the base electrode of the transistor 10. The base electrode of the transistor 10 is adjusted at the desired direct voltage potential with the aid of a base potential divider comprising two resistors 13 and 14, for example, at a potential such that the direct current flowing through the transistor 10 is approximately 2 ma. A potential divider comprising two resistors 15 and 16 is included to provide the direct voltage for the base electrode of the transistor 9 while this base electrode is connected to ground by means of a capacitor 17 for the signal voltages. An inductor 18 incorporated between the base electrodes of the transistors 8 and 9 ensures on the one hand that these two base electrodes have the same direct voltage while on the other hand this inductor prevents the signal applied to the base electrode of the transistor 8 from flowing away through the capacitor 17.

The level of the IF signal applied to the base electrode of the transistor 8 is chosen to be such that this transistor and the transistor 9 controlled in phase opposition through the common emitters always substantially function as switches so that always one of the transistors is substantially cut off while the other conveys the complete collector current of the transistor 10. During the signal portions when the base voltage of the transistor 8 is positive relative to the base direct voltage of the transistor 9, the transistor 9 is therefore cut off and the transistor 8 conveys substantially the complete collector current of the transistor 10; on the other hand, during the other signal portions when the base voltage of the transistor 8 is negative relative to the base direct voltage of the transistor 9, the transistor 8 is cut off and the transistor 9 conveys the complete collector current of the transistor 10. It is to be noted that already 95 percent of the collector current of the transistor 10 flows through the transistor 8 at a voltage difference of approximately 60 mv. between the base electrode of the transistor 8 and the base electrode of the transistor 9. Consequently, if the signal applied to the base electrode of the transistor 8 has an amplitude of 60 mv. peak value or more, the transistors 8 and 9 function substantially as switches.

The transistor 10 is controlled with the aid of the output signal of the transistor 2 through the capacitor 12. For a linear detection of the television signal it is important that the transistor 10 functions as a linear amplifier, that is to say, the collector current provided by the transistor 10 is a true copy of the signal voltage applied to the base electrode. To this end the emitter lead of the transistor 10 includes an emitter resistor 11 functioning as a negative feedback resistor and having a high value such that the greater part of the signal voltage applied is present across this resistor.

The detected television signal is derived from a resistor 19 included in the collector line of the transistor 9. Since this signal still contains carrier remainders, the signal is subsequently lead through a filter network 20 by which these carrier remainders are suppressed.

In addition to the detected video signal, other signals are generally derived from the video detector in a television receiver. For example, the television signal often includes a frequency-modulated sound subcarrier which may be recovered in the video detector; in addition to the video signal which is applied to the display tube, it is also necessary to have in a television receiver synchronizing pulses available for the synchronization of the deflection equipment present in the receiver. For these and similar cases it is advantageous for the video detection circuit according to the invention to have two outputs, namely the collector electrodes of the transistors 8 and 9 which do not exert influence on each other. Thus, while one of the desired detector products is derived from the collector electrode of the transistor 9, another desired detector product may be derived from the collector electrode of the transistor 8 while the circuit elements which serve for the takeoff of one detector product do not exert any detrimental influence on the takeoff of the other detector product and vice versa. In the circuit arrangement of FIG. 1 the collector line of the transistor 8 includes a transformer 21 which serves for takeoff of the sound subcarrier provided by the detector. This transformer is tuned to the frequency of this subcarrier with the aid of a capacitor 22.

The relatively strong carrier fundamental component which is present in the collector leads of the transistors 8 and 9 may be avoided in a simple manner, particularly when the circuit arrangement is integrated, by incorporating a second long-tailed pair arrangement which corresponds to the long-tailed pair arrangement 8–9–10, but in which the two transistors 10 of the two long-tailed pair arrangements are controlled in phase opposition by the signal. An output signal may be derived from the interconnected collector electrodes of the transistor 9 of the first long-tailed pair arrangement and the transistor 8 of the second long-tailed pair arrangement. A second output signal may optionally be derived from the interconnected collector electrodes of the transistor 8 of the first long-tailed pair arrangement and the transistor 9 of the second long-tailed pair arrangement. Since in such a circuit arrangement the fundamental component of the carrier no longer occurs in the output lines, the filter 20 may be replaced by a simpler filter network.

As has been noted the transistors 8 and 9 operate effectively as switches when alternating voltages of 60 mv. peak value are applied between the base electrodes of these transistors. In a television signal modulated at a modulation depth of 90 percent this means that an output voltage of 1.2 v. peak-to-peak value must be provided by the last IF amplifier stage, which voltage is considerably lower than the voltage (10 v. peak-to-peak value) required for a conventional diode detector. As described in the preamble, this results in considerable advantages in the proportioning of the IF amplifiers.

FIG. 2 shows the detection characteristics (the detected output voltage $V_o$ as a function of the input amplitude $V_i$) of a conventional diode detector employing a germanium diode (curve I) and of a detector according to the invention (curve II). An important factor for a detection which is free from distortion is that this detection characteristic extends as linearly as possible. This Figure clearly shows that a diode detector is only usable for input amplitudes of more than approximately 0.5 volt, whereas the detector according to the invention linearly detects already from approximately 50 mv. A characteristic difference between the two detection characteristics is that for great signal amplitudes the characteristic of a diode detector continues to extend parallel to the line $V_o=V_i$ shown as a broken line, whereas the characteristic of the detector according to the invention approaches this line asymptotically.

What is claimed is:

1. A circuit for detecting a signal comprising first, second and third transistors each having emitter, base, and collector electrodes, said emitters of said first and second transistors being coupled together, said third transistor collector being coupled to said first and second transistor emitters; means for switching said first and second transistors between a substantially saturated state and a substantially cutoff state including means for applying said signal to said first transistor base, means for operating said third transistor in a linear mode including means for applying said signal to said third transistor base; and first means for deriving a detected signal from the collector of one of said first and second transistors.

2. A circuit as claimed in claim 1 wherein said signal comprises a video component and an audio component and further comprising second means for deriving said audio component from the remaining collector of said first and second transistors.

3. A circuit as claimed in claim 5 wherein said second deriving means comprises a parallel tuned circuit coupled to said first transistor collector and tuned to the frequency of said audio component.

4. A circuit as claimed in claim 1 wherein said first deriving means comprises a tuned circuit coupled to said second transistor collector and tuned to the video component frequency.

5. A circuit as claimed in claim 1 wherein said linear mode operating means further comprises a resistor coupled in series with said third transistor emitter.

* * * * *

PO-1050
(5/69)

UNITED STATES PATENT OFFICE
CERTIFICATE OF CORRECTION

Patent No. 3,646,458 Dated February 29, 1972

Inventor(s) LEONARDUS A. J. VERHOEVEN ET AL

It is certified that error appears in the above-identified patent and that said Letters Patent are hereby corrected as shown below:

IN THE CLAIMS

Col. 4, line 51, "5" should read -- 2 --;

Signed and sealed this 13th day of March 1973.

(SEAL)
Attest:

EDWARD M.FLETCHER,JR.
Attesting Officer

ROBERT GOTTSCHALK
Commissioner of Patents